United States Patent [19]

Rao

[11] Patent Number: 4,755,950

[45] Date of Patent: Jul. 5, 1988

[54] STOCK DIVIDER INCLUDING A COMPUTER CONTROLLED GEAR LOCATOR

[75] Inventor: Suren B. Rao, Troy, Mich.

[73] Assignee: National Broach & Machine Company, Troy, Mich.

[21] Appl. No.: 856,485

[22] Filed: Apr. 28, 1986

[51] Int. Cl.⁴ .............................................. B24B 49/00
[52] U.S. Cl. .................... 364/474; 51/52 K; 51/95 GH; 51/165.71; 51/165.87
[58] Field of Search .................. 364/474; 51/165.71, 51/165.87, 165 R, 52 R, 52 HB, 95 GH, 95 LH

[56] References Cited

U.S. PATENT DOCUMENTS

| | | | |
|---|---|---|---|
| 4,555,871 | 12/1985 | Bloch et al. | 51/95 GH |
| 4,561,216 | 12/1985 | Miyatake et al. | 51/95 GH |
| 4,585,377 | 4/1986 | Nozawa et al. | 51/95 GH |
| 4,589,230 | 5/1986 | Yonemura et al. | 51/95 GH |
| 4,613,869 | 12/1986 | Miyatake et al. | 51/95 GH |
| 4,613,870 | 12/1986 | Sun | 51/165.71 |
| 4,617,761 | 10/1986 | Miyatake et al. | 51/95 GH |

*Primary Examiner*—Jerry Smith
*Assistant Examiner*—Allen MacDonald
*Attorney, Agent, or Firm*—Barnes, Kisselle, Raisch, Choate, Whittemore & Hulbert

[57] ABSTRACT

A grinder for form grinding gear teeth in which a work gear is positioned rotationally by a computer controlled drive. A sensitive probe in known angular relation to a grinding wheel about the axis of the gear is positioned at random in any tooth space, and senses the angular positions of the gear when the gear is driven in opposite directions into probe actuating positions of adjacent tooth surfaces. The computer then controls the gear drive to rotate it reversely by one half of such angular movement from the last position.

7 Claims, 3 Drawing Sheets

STOCK DIVIDER INCLUDING A COMPUTER CONTROLLED GEAR LOCATOR

Grinding of cylindrical (spur or helical) gears is a precision operation and is employed generally in aviation and instrument gears where the utmost in accuracy of the shape and location of the gear teeth is required. In production form gear grinding in general terms, the periphery of a grinding wheel is trimmed to the cross-sectional shape of a tooth space between two adjacent gear teeth. The wheel is rotated to produce the required surface speed of the grinding surface, the periphery of the wheel is introduced into a tooth space, and, by relative axial traverse, is caused to grind both tooth flanks simultaneously progressively from end to end.

If the gear is a spur gear, the grinding wheel is set with its axis perpendicular to the axis of the gear, and the wheel is fixed against rotation during axial traverse. If the gear is a helical gear, the grinding wheel is set at the required helix angle, and the gear is given a controlled rotation related to the axial advance to generate the helix.

Finish form grinding of case hardened gears poses a further problem. It is always desirable in form grinding gear teeth to provide for removal of equal amounts of material from opposite sides of the tooth space, as a matter of economy. However, when the gear teeth are case hardened, this becomes a more stringent requirement. If the grinding wheel is not precisely centered in the tooth space, more material than necessary is removed at one side to insure that the other side of the tooth space is properly ground, and in some cases the hardened case is removed from one tooth surface.

The centering of the grinding wheel in a tooth space is referred to as "stock dividing", and in the past this has been left to the operator to determine by sight and/or sound to provide simultaneous initial contact between the wheel and both sides of a tooth space.

In the past, relating the rotation of the gear to the relative axial traverse between the gear and grinding wheel was produced mechanically by an accurately ground lead bar and nut mechanism, or a so-called sine bar and follower mechanism, such as disclosed in prior U.S. Pat. No. 3,440,769. This patent incidentally shows means for adjusting the sine bar to accomplish the finely controlled rotation of the gear to perform the stock dividing action.

It was also customary in the past to provide index rotation of the work gear mechanically, by employing accurately ground index discs with equally spaced notches equal to the number of teeth on the gear. The disc was connected to rotate with the gear, and the gear could be rotated to advance the disc by precisely one tooth indexed space and to be fixed in position by a dog or finger fitting within a notch.

There is now available electrical motor means employing computer numerical control (CNC) for rotating the gear to a predetermined programmed or computed position which is accurate to a fraction of a second of arc, and to rotate the gear from a predetermined position to any other position with corresponding accuracy. Thus, indexing may be computer controlled with an accuracy not heretofore obtainable.

In addition, the rotation of the gear in timed relation to axial transverse between the gear and a grinding wheel may be controlled by such axial traverse. Traverse of the gear or wheel in a direction parallel to the axis of the gear is sensed by electrical pick-up means which, through proper programming of the computer, operates the motor drive to rotate the gear in timed relation to axial traverse to generate the desired helix angle. More specifically, the instantaneous angular position of the gear is thus related with utmost precision to the relative position of the gear and grinding wheel as regards relative traverse in a direction parallel to the gear axis.

Thus, the indexing of the gear, and the timed rotation thereof related to relative traverse is accomplished by computer numerical control, and the mechanically operable index disc and the lead or sine bar are eliminated.

In accordance with the present invention, the computer numerical control of gear rotation is combined with additional structure to provide an automatic gear grinding machine capable of stock division with an accuracy and speed not heretofore attainable.

There is thus provided a novel CNC gear grinding machine characterized by reduction of set up time, as well as improved accuracy in stock dividing.

Since the work gear already has teeth cut thereon, it is necessary to locate the grinding wheel in a tooth space such that equal amounts of stock will be removed by opposite sides of the wheel. In the past, this has been done by the operator in a manual fashion, and the time required to do this has been considered a part of the set up time when each work gear is mounted on the machine.

The present invention provides modification of a CNC gear grinder, as above described, to provide stock dividing which is automatic, thus resulting in a reduced set up time and correspondingly increased productivity. In addition, the stock dividing operating is more accurate than heretofore possible manually, thus actually reducing the average grinding time. Finally, the operation provides for the first time the capability of sensing the circumferential angular width of any desired number of tooth spaces, so that the average of such widths can be obtained and an average proper stock dividing location of the gear for all indexed positions thereof thereby determined.

The foregoing is accomplished by providing a sensitive probe accurately located with reference to the location of the grinding wheel movable into and out of a tooth space of the gear. In a simple case, the center of the probe has the same angular position as the wheel circumferentially of the gear. The probe tip may be of the contacting or non-contacting type, and excellent results have been obtained using a touch trigger (TT) probe.

A probe having a ball shaped tip of a size substantially smaller than the space between tooth surfaces at opposite sides of a tooth space, is thus positioned in the tooth space. The gear is rotated in one direction until one tooth flank activates the probe, and the angular position (Oa°) of the gear is registered in the computer. The direction of rotation of the gear is reversed from position Oa°, continued until the flank of the adjacent tooth actuates the probe. The angular position of the gear (Ob°) at this instant is registered in the computer. The difference in the two rotary positions, Oa°-Ob° is computed, and the gear reversely driven under computer control through an arc equal to one half of this value, at which time the center of the ball tip and hence the grinding wheel are centered with respect to the tooth space, and a precise stock divided condition is achieved.

It will be apparent that the location of the probe may be circumferentially spaced from the location of the grinding wheel, provided that this information is registered in the computer. Similarly, the location of the probe axially of the gear is supplied to the computer, so that if the gear is a helical gear, the ball may be helically aligned with the wheel.

In order to make a more precise stock division, a number of determinations may be made of the values corresponding to Oa° and Ob° for any desired number of tooth spaces. Not only the average value of the differences corresponding to Oa°-Ob° is computed, but also any variation in the location of the tooth flanks from the theoretical, taking into account the highly accurate indexing accomplished by the computer controlled gear positioner.

Grinding is then initiated at the last tooth space probed, and all further indexing of the gear, to grind the other teeth, is done on the basis of the precise proper angular location of the gear teeth based on average values of differences corresponding to Oa°-Ob°, as well as possible variations in tooth-to-tooth spacing.

If the probe cannot conveniently be mounted in the plane of the grinding wheel, or in helical alignment therewith, then the angular displacement between the wheel and the probe will be registered in the computer. Since this is a constant value, all stock dividing measurements on the probe will be corrected by the constant angular displacement between the probe and wheel, but this will be accomplished automatically by the accurate indexing which the computer will perform.

DESCRIPTION OF THE PREFERRED EMBODIMENT

Figure 1:
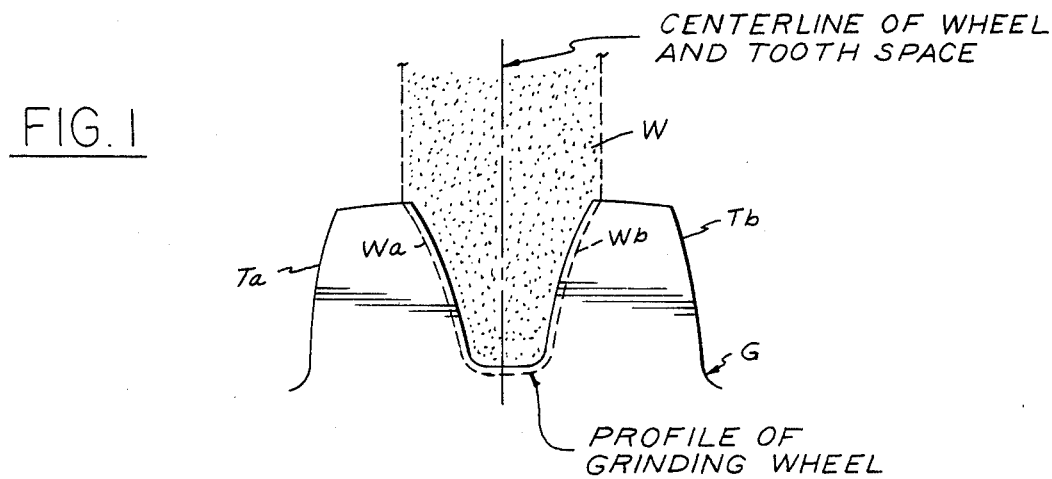
FIG. 1 is a diagrammatic view illustrating stock division.

Referring first to FIG. 1, there is illustrated the position of a grinding wheel W in a tooth space at a gear G between two gear teeth Ta and Tb. The condition of the unground teeth is illustrated in full lines, and the position of the trimmed peripheral portion of the wheel is indicated by the dotted lines of Wa and Wb. The material of the gear teeth between full lines and the dotted lines Wa and Wb represents the stock which will be removed from the flanks of the tooth at a single pass of relative traverse between the gear G and wheel W in a direction parallel to the axis of the gear. Where the depth of the space between the full lines representing the underground profiles of the flanks of teeth Ta and Tb, and the dotted lines Wa and Wb, respectively is equal at both sides of the tooth space, proper stock division is achieved.

It will be understood that if the gear is a helical gear, the grinding wheel will be set around at the helix angle of the gear, and that in addition, relative traverse between the gear and wheel axially of the gear will be accompanied by relative rotation between the gear and wheel in timed relation to traverse to generate the required helix, conveniently by rotation of the gear.

Furthermore, it will be apparent that each tooth space is ground separately, so that after each pass, the gear will be indexed in rotation to bring another tooth space into alignment with the wheel.

In the past, stock dividing has been essentially a manual operation during step up for each gear. The wheel while rotating was moved radially of the gear into the tooth space and the gear adjusted angularly until initial contact of the wheel with both tooth surfaces, occurred simultaneously. Initial contact was noted by the operator visually from sparks, or by sound. Once equal stock division was obtained, the gear was rigidly connected to index mechanism, and the gear was indexed after grinding each tooth space.

Figure 2:
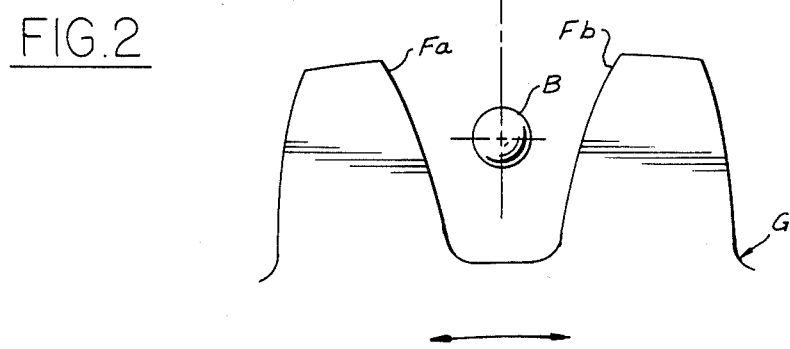
FIG. 2 is a diagrammatic view showing the probe tip in stock dividing position.

The automatic stock dividing of the present invention is accomplished by inserting the ball tip B of a sensitive probe into the space between confronting tooth flanks Fa and Fb. The initial location of the tip B is immaterial, but it is illustrated in FIG. 2 as spaced substantially equally from both flanks Fa and Fb, or centered on the center line C of the tooth space.

The probe tip B may be in the plane of the grinding wheel, or angularly spaced about the axis of the gear G by a known amount. If the gear is helical, the tip B is in helical alignment with the grinding wheel. Accordingly, when the gear is adjusted into a position such that the ball tip B is spaced equally from the tooth flanks Fa and Fb, proper stock division as illustrated in FIG. 1 is achieved.

In accordance with the present invention, the gear is rotated in one direction until the probe is actuated by one flank of a tooth, as for example, the flank Fa. The probe may be actuated by proximity to the tooth flank, or by contact therewith, and such probes are readily available, one such being referred to as touch trigger (TT). Actuation of the probe signals the instantaneous angular position of the gear Oa° when the probe tip is actuated and this position is transmitted to and registered in the computer, which is herein considered to be a numerical controlled computer (CNC). The computer is connected to control both motor means rotating the gear to precisely determined successive positions, and motor means for providing relative traverse between the gear and wheel axially of the gear into a succession of precisely determined relative positions.

Actuation of the probe not only stores the instantaneous position of the gear, Oa°, but by computer control, also reverses the direction of gear rotation, which continues until the probe is actuated by the other tooth flank Fb. This determines a second gear position, Ob°, which is transmitted to the computer, which is programmed to determine the angular displacement represented by the difference between Oa° and Ob°. In the simplest case, the computer determines one half of this difference, and again reverses the direction of rotation of the gear and controls its motor drive to cause the gear to move through an angular distance of one half the arc Ob°-Oa°, and stop. At this time the angular position of the gear is then Ob°−(Ob°−Oa°)/2, designated Oc°, which represents a true stock divided position, based only on probe determined positions Oa° and Ob° in a single tooth space.

The grinding wheel will now be presented to the tooth space between flanks Fa and Fb, and fed to a proper depth and thereafter relative traverse is provided by computer control of the traverse motor drive means, together with computer control of the rotation of the gear by the rotary drive means, if the gear is a helical gear.

The grinding of the tooth flanks Fa and Fb is completed by one or more successive passes or traverse strokes, and radial feed between successive traverse strokes, as well as final depth of feed, is preferably accomplished by a feed motor drive controlled by the computer.

Figure 3:
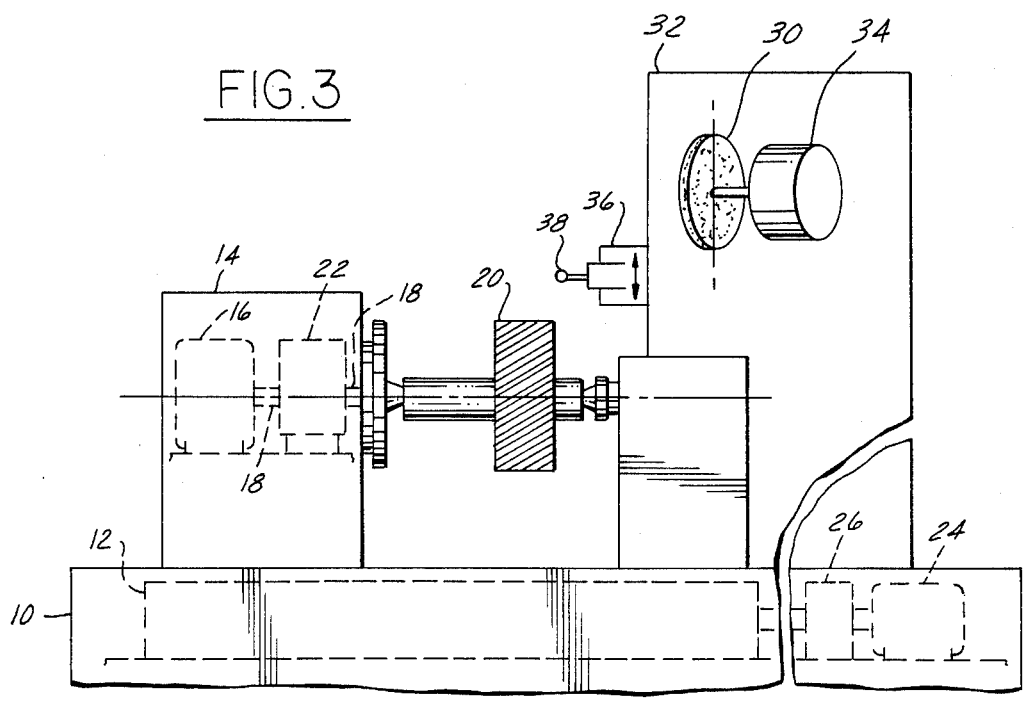
FIG. 3 is a simplified elevational view of the grinder.

Referring now to FIG. 3, there is a diagrammatic illustration of the essential components of the grinder with the stock divider.

The base 10 has a horizontally movable slide or table 12 therein. On the slide is mounted a headstock 14 in which is mounted a motor 16 having a drive shaft 18 connected in driving relation to the shaft of a work gear 20, here shown a helical. The shaft 18 has sensing means 22 responsive to the angular position of shaft 18 and gear 20.

The slide 12 is traversed by a motor 24 through a traverse drive 26, which includes means (not shown) sensing the instantaneous position of table axially of the gear 20. The CNC system thus senses the instantaneous angular position of the gear 20 as well as its axial position, and is programmed to relate the two, thus providing for helical advance of teeth and tooth spaces of the gear. For a spur gear, of course, motor 16 holds the gear against rotation as table 12 is traversed.

The grinding wheel 30 is vertically adjustable on a head 32 and is adjustable about a vertical axis radial of the gear to align the plane of the wheel with the tooth space being ground. The wheel is driven at grinding speed by a motor 34.

The head 32 also carries a vertically adjustable probe 26 having a probe tip 38, which may be spherical and have a sensitive tip operated by actual contact with a tooth surface or by close approach to a tooth surface. Either type of tip may be broadly referred to as being actuated by proximity of the tip to a tooth surface. In a simple case, the tip 38 may be in the plane containing the vertical axis of adjustment of the wheel 30 and the axis of the gear. This is not required, however, and the tip may be angularly displaced from this plane by a known amount. This displacement is programmed into the CNC system, so that when the tip is centered between the tooth flanks, the wheel 30 will be similarly centered when brought into operating position.

The grinding operation is carried out by locating the gear in rotation for accurate stock division as above described followed by feeding the head into position to insert the wheel into stock-dividing position in a tooth space. Thereafter the table 12 is traversed in one or more strokes, while the head is fed incrementally between strokes to full depth. The head is then moved radially of the gear to withdraw the wheel from a tooth space, the gear indexed and the grinding operation repeated until all teeth have been around.

The CNC control system for operating motor 16 both for stock division, lead control, and indexing is commercially available as is the touch trigger (TT) tip.

Figure 4:
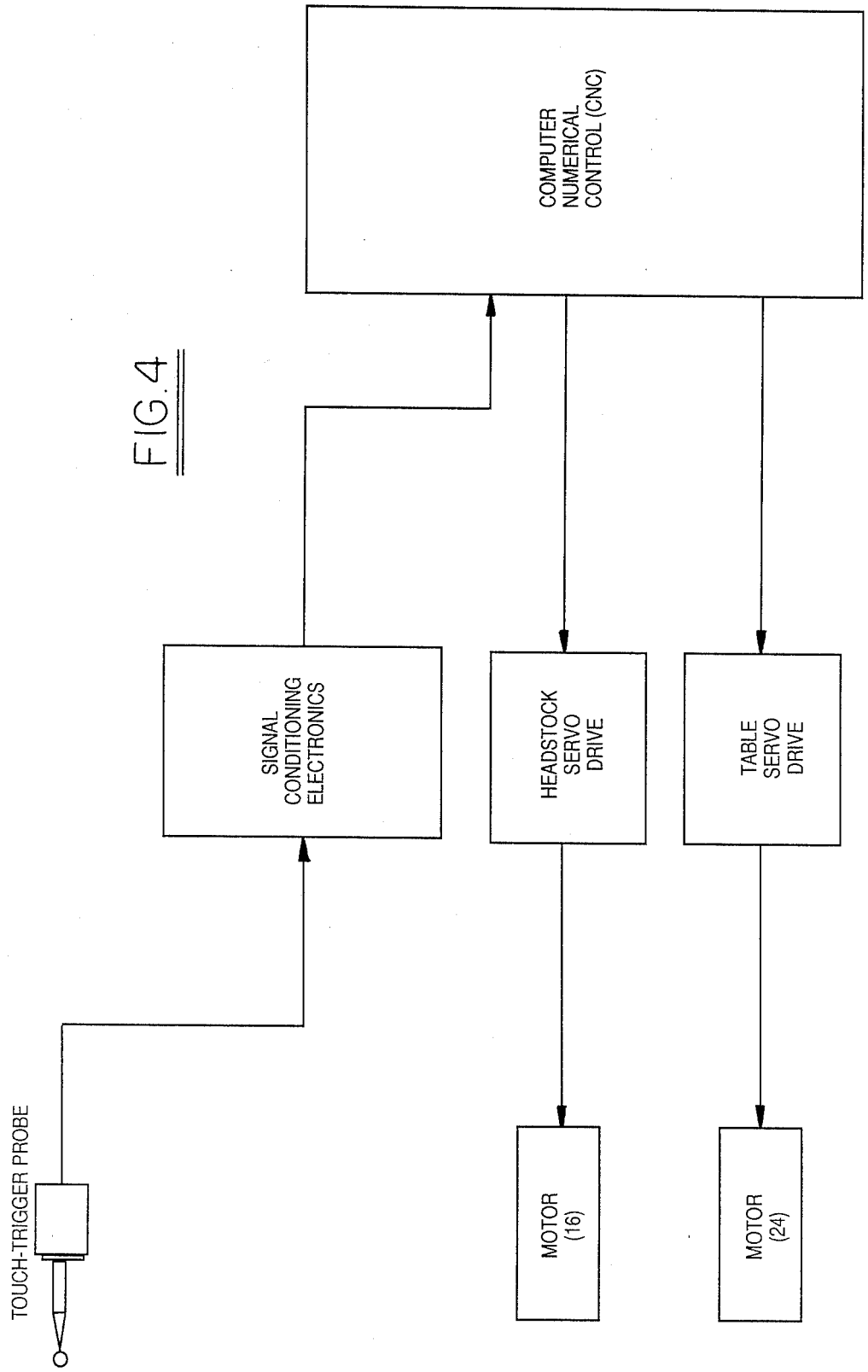
FIG. 4 is a schematic representation of the stock divider hardware.

FIG. 4 shows a schematic representation of the gear locator and stock divider hardware. It consists of the TT probe whose output is read by the numerical control computer after being processed by the signal conditioning electronics. The computer also controls the angular position of the gear for stock dividing and grinding purposes through the headstock servo control and the table, for gear locating and other purposes, through the table servo control.

Figure 5:
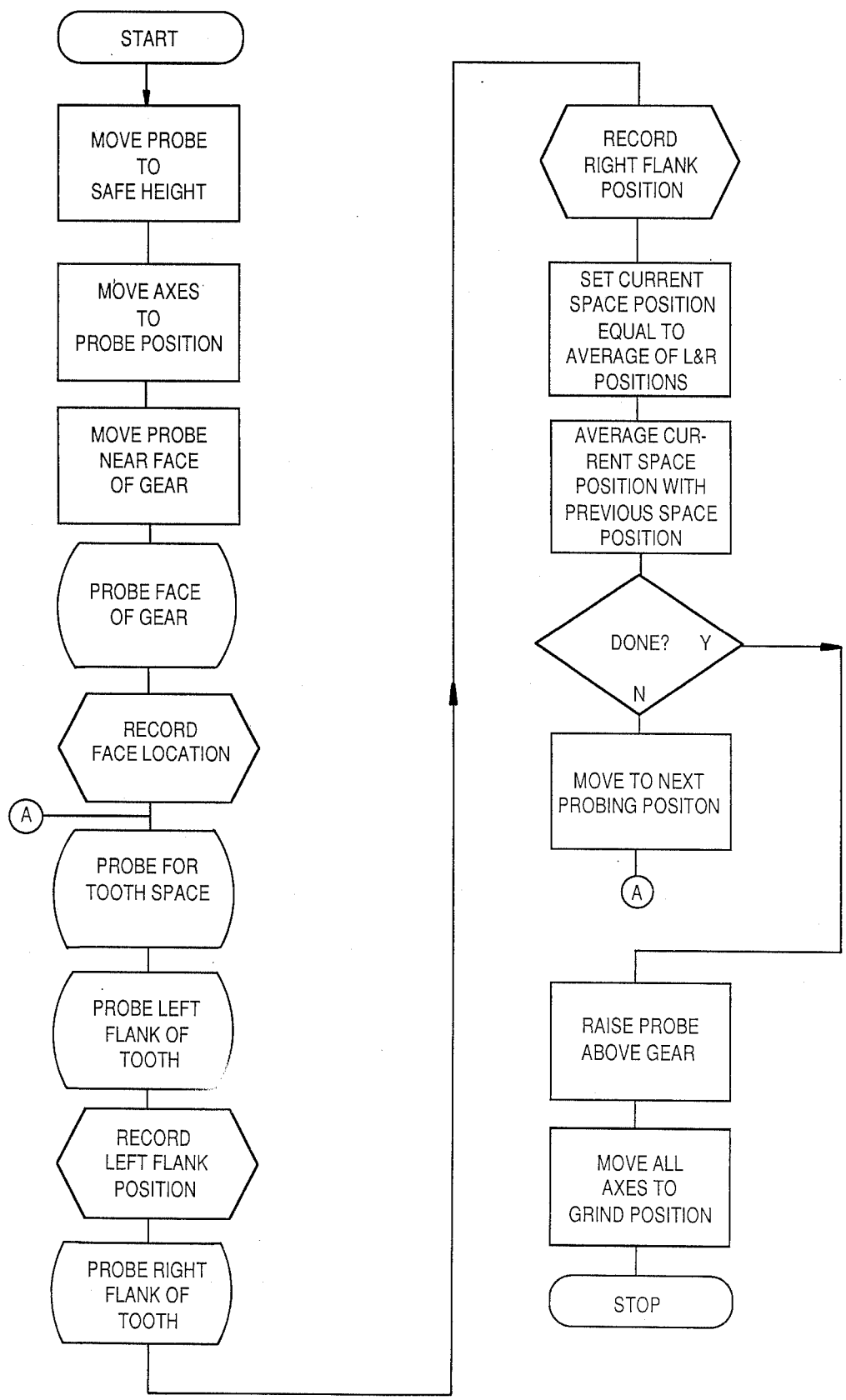
FIG. 5 is a flow chart representation of the stock divider software.

Referring to FIG. 5, which shows a flow chart of the software, when the gear location and stock divide function is initiated the probe is moved to a specified location to start the process. This starting position is determined automatically by the computer based on the dimensions of the gear that have already been communicated to it. It then moves the table till the TT probe senses the gear face and this position is registered in the computer.

Then the probe is inserted in the space between two consecutive teeth on the gear. The gear is then rotated in clockwise and counter-clockwise directions to sense the left (Fa) and right (Fb) flanks of a tooth space. The angular position O°A and O°B are recorded and the average computed. If stock dividing is to be accomplished based on only one tooth space the "done" block is satisfied with a "Y" answer and the machine automatically moves to the grind position and stops for the grinding cycle to be initiated. If the stock dividing has to be accomplished on the basis of more than one tooth space, then, as FIG. 5 illustrates, the gear is moved to the next probing position and the loop is followed through again.

It will be recalled that index rotation of the gear between grinding of successive tooth spaces is in this grinder accomplished by the rotary drive motor controlled by the computer, so that having determined in effect the center line of one tooth space, indexing provides for grinding of all tooth spaces to accurately indexed and stock divided positions.

However, there remains the possibility that variations may exist in the angular width of the several tooth spaces. Accordingly, the computer may be programmed to determine the angular width of any desired number of tooth spaces, and averaging these to provide a stock dividing operation which is based on these average values. This is readily accomplished by programming the computer to withdraw the probe from the tooth spaces following each operation, indexing the gear to one or more additional selected positions, reinserting the probe, and determining additional values of angular width of additional spaces. The average of these values is used to control the amount of reverse rotation from the position occupied by the gear following completion of the last width measuring operation.

There still remains the possibility of error due to minor variations in tooth-to-tooth spacing. This may be determined and taken into account in the stock dividing operation, by programming the computer to compare the values of the successive angular positions occupied by the gear at the initial and/or second (and preferably the second) actuation of the probe in successive tooth spaces with the initial and/or second actuation thereof, respectively, in the initial tooth space. If tooth-to-tooth spacing is accurate, these successive values will be equal to the initial gear position plus an angular increment equal to tooth-to-tooth index rotation times the number of tooth spaces from the originally tested tooth space. The average of the deviations from the gear position determined at the initial operation is then applied as a correction in the amount of reverse rotation from the position occupied at the second probe actuation in the final gear tooth space checked.

From the foregoing, it will be seen that the simplest operation is to determine by probing a single tooth space, the accurate stock divided position of this tooth space of the gear relative to the gear wheel. The center line of this tooth space is then centered with respect to the wheel, and successive tooth spaces are ground with the gear indexed accurately from this initial stock divided position.

A first modification is to determine and use the average effective widths of a plurality or all of the tooth space to determine angular reverse movement of the gear into initial stock divided position from the position occupied by the gear at the conclusion of the last probe operation.

A second modification is to determine a corrected theoretical position of the gear from which to apply the corrected average one half effective tooth space width, by computing average indexed tooth positions from an initial position, and basing on the reverse rotation of the gear from its final probed position on this averaged computed position rather than its actual position.

Thus, in a simple case, the axis of the gear is horizontal, the axis about which the wheel is adjustable is vertical and intersects the gear axis. The center of the sensitive tip B occupying the vertical plane contains both the gear axis and wheel axis. If the gear is a spur gear, stock division by the mechanism described is effective to insure proper stock division between the wheel and gear as the gear is traversed to pass beneath the wheel. If the gear is helical, the wheel is set around at the proper helix angle. The distance between the vertical axis of adjustment of the wheel and the center of the ball tip B is known and stored in the computer. The ball tip is centered in stock dividing relation in a tooth space at the top of the gear, the rotational position of the gear is observed, and the tip B is withdrawn, by raising it or by traverse of the gear toward the wheel. The correction to the rotational position of the gear required by the helix angle of the gear and the distance between the center of the top and the vertical axis of adjustment of the wheel is computed in the CNC control and made by rotation of the gear without horizontal traverse. Thereafter, the gear is traversed beneath the wheel with appropriate rotation, incremental wheel depth feed, and automatic indexing as is known in the art.

I claim:

1. A form grinder for grinding gear teeth comprising, a rotary spindle for supporting a work gear, a spindle drive motor for rotating said spindle, a grinding wheel having its periphery trimmed to conform to the cross-section of a tooth space of the gear,
a wheel drive for rotating the wheel at grinding speeds,
a traverse drive motor for effecting relative traverse between the gear and wheel in a direction generally parallel to the gear axis,
stock divide mechanism comprising a sensitive probe adapted to be positioned at random in a tooth space of said gear,
a probe positioner for introducing the tip of said probe at random into a tooth space of the work gear fixed to said spindle and for withdrawing said tip to provide for rotating of said spindle for grinding all of the gear teeth,
a computer,
control means operated by said computer for initiating slow rotation of said spindle drive motor in one direction upon introduction of said tip into a tooth space,
sensing means actuated by proximity of said tip to one side of the tooth space for transmitting a first angular position of the gear to said computer for storage in said computer and for effecting operation of said control means to reverse said spindle drive motor,
said sensing means being actuated by proximity of said tip to the other side of the tooth space for transmitting a second angular position of the gear to the computer for storage in the computer and for effecting operation of said control means to again reverse said spindle drive motor, and
said computer including means for determining one half of the angular difference between said first and second angular positions and for effecting operation of said control means to terminate the second reverse rotation of said spindle drive motor when said second reverse rotation is equal to said one half of said angular difference.

2. A grinder as defined in claim 1, in which said probe positioner comprises electrically actuated means, and computer controlled means for operating said electrically actuated means to perform a series of stock dividing measurements in different tooth spaces of the gear, said computer including means for averaging the measured angular differences thus obtained and controlling the second reverse rotation of the spindle in the last tooth space to the average angular difference as thus determined.

3. A grinder as defined in claim 1, including an adjustable support means for effecting angular adjustment of said wheel, and wherein said computer has means for causing said control means to actuate said spindle drive motor in timed relation to the operation of said traverse drive motor, to generate a helical path between the work gear and said wheel.

4. A grinder as defined in claim 1, wherein said computer has means for operating said control means to effect rotation of said spindle drive motor to produce indexing of said spindle limited angular distances equal to the spacing between gear teeth.

5. A grinder as defined in claim 4, including an adjustable support means for effecting angular adjustment of said wheel, and wherein said computer has means for causing said control means to actuate said spindle drive motor in timed relation to the operation of said traverse drive motor, to generate a helical path between the work gear and said wheel.

6. A computer controlled stock divider for a computer controlled grinding machine in which a rotary work gear support spindle is connected to a spindle drive motor and said motor is operated by a control means governed by a computer,
a sensitive probe actuated by proximaity to either side of a tooth space of a gear on said spindle,
means for positioning said probe tip in a random position in a tooth space of a gear,
control means operated by said computer for initating rotation of said spindle drive motor in one direction upon introduction of said tip into a tooth space,
sensing means actuated by proximity of said tip to one side of the tooth space for transmitting a first angular position of the gear to said computer for storage in said computer and for effecting operation of said control means to reverse said spindle drive motor,
said sensing means being actuated by proximity of said tip to the other side of the tooth space for transmitting a second angular position of the gear to the computer for storage in the computer and for effecting operation of said control means to again reverse said spindle drive motor, and said computer including means for determining one-half of the angular difference between said first and second angular positions and for effecting operation of said control means to terminate the second reverse rotation of said spindle drive motor when said reverse rotation is equal to one-half of said angular difference.

7. A method of stock dividing for use with a grinding machine for grinding the teeth of a gear, comprising
providing a sensitive probe actuated by proximity to either side of a tooth space of a gear,
positioning said probe tip in a random position in the tooth space of a gear,
rotating said gear in one direction upon introduction of said tip into the tooth space,
sensing by proximity of said tip to one side of the tooth space a first angular position of the gear and thereupon reverse rotating said gear,
sensing by proximity of said tip to the other side of the tooth space a second angular position of the gear and thereupon again reverse rotating said gear,
computing one-half of the angular difference between said first and second gear positions,
and terminating the second reverse rotation of said gear when said reverse rotation is equal to one-half of said angular difference.

* * * * *